(12) United States Patent
Hoebener et al.

(10) Patent No.: US 7,077,373 B1
(45) Date of Patent: Jul. 18, 2006

(54) MOUNT FOR TV MONITOR

(75) Inventors: Christian M. Hoebener, Wichita, KS (US); Jon A. Lofgreen, Wichita, KS (US); Troy A. Bush, Goddard, KS (US)

(73) Assignee: Da-Lite Screen Co., Inc., Warsaw, IN (US)

( * ) Notice: Subject to any disclaimer, the term of this patent is extended or adjusted under 35 U.S.C. 154(b) by 671 days.

(21) Appl. No.: 09/754,716

(22) Filed: Jan. 4, 2001

Related U.S. Application Data

(60) Provisional application No. 60/174,463, filed on Jan. 5, 2000.

(51) Int. Cl.
*E04G 3/00* (2006.01)

(52) U.S. Cl. .............................. 248/278.1; 248/281.11; 248/316.1; 248/371

(58) Field of Classification Search ................ 248/317, 248/323, 324, 333, 291.1, 917, 919, 922, 248/923, 343, 371; 403/142, 87, 157
See application file for complete search history.

(56) References Cited

U.S. PATENT DOCUMENTS

| | | | | |
|---|---|---|---|---|
| 2,956,768 A | * | 10/1960 | Livingston ............... 248/278.1 |
| D270,689 S | | 9/1983 | Boscacci ..................... D6/513 |
| 4,447,031 A | * | 5/1984 | Souder et al. ......... 248/281.11 |
| 4,613,109 A | | 9/1986 | Boscacci .................... 248/553 |
| 4,852,842 A | | 8/1989 | O'Neill .................... 248/284.1 |
| 4,878,645 A | | 11/1989 | O'Neill ....................... 248/680 |
| 4,928,914 A | | 5/1990 | Snodell ................... 248/284.1 |
| D309,562 S | | 7/1990 | Boscacci ..................... D8/373 |
| 5,009,384 A | | 4/1991 | Gerke et al. ................. 248/343 |
| D320,928 S | | 10/1991 | Boscacci et al. ............. D8/363 |
| 5,064,161 A | | 11/1991 | Anderson .................... 248/317 |
| D322,210 S | | 12/1991 | Boscacci et al. ............. D8/373 |
| 5,127,617 A | | 7/1992 | Bergetz .................... 248/278.1 |
| 5,139,223 A | | 8/1992 | Sedighzadeh ............... 248/324 |
| 5,251,859 A | | 10/1993 | Cyrell et al. ........... 248/288.51 |
| 5,255,884 A | | 10/1993 | O'Neill ....................... 248/329 |
| 5,310,152 A | | 5/1994 | O'Neill ....................... 248/329 |
| 5,379,977 A | | 1/1995 | Ronn et al. ............... 248/277.1 |

(Continued)

FOREIGN PATENT DOCUMENTS

GB 2100090 A * 12/1982

OTHER PUBLICATIONS

Website Page, "Jumbo 2000 Quick Connect Feature", Peerless Industries, Inc., p. 1 of 1, http://www.peerlessindustries.com/jumbo2000_quickconnect.htm, Dec. 15, 1999.

(Continued)

*Primary Examiner*—Leslie A. Braun
*Assistant Examiner*—Tan Le
(74) *Attorney, Agent, or Firm*—Vorys, Sater, Seymour and Pease LLP

(57) ABSTRACT

A mount for an appliance such as a TV monitor which includes a box-like frame having a catch part at the top of the frame. A swivel part which may be attached to either the ceiling or the wall is provided. The catch part has a slot into which the swivel part is fitted, thus engaging the catch part to support the frame and the appliance. The disclosed support provides for ease of assembly as the appliance is supported from the ceiling or wall by the mere placement of said swivel in the catch part, without requiring any other assembly. The appliance may be tilted or rotated in the support.

22 Claims, 11 Drawing Sheets

U.S. PATENT DOCUMENTS

| | | | |
|---|---|---|---|
| 5,383,641 A | 1/1995 | Bergetz | 248/425 |
| 5,405,117 A | 4/1995 | Davis | 248/333 |
| 5,490,655 A | 2/1996 | Bates | 248/329 |
| D377,897 S * | 2/1997 | Vogels | D6/513 |
| RE35,677 E | 12/1997 | O'Neill | 248/551 |
| 5,775,665 A | 7/1998 | Haskin et al. | 248/551 |
| 5,797,568 A * | 8/1998 | Canton Gongora et al. | 248/122.1 |
| D398,834 S | 9/1998 | O'Neill | D8/349 |
| 5,915,658 A * | 6/1999 | Sheng | 248/371 X |
| 5,927,668 A * | 7/1999 | Cyrell | 248/316.1 |
| 5,934,636 A | 8/1999 | Cyrell | 248/246 |
| 5,941,492 A | 8/1999 | O'Neill | 248/317 |
| 6,012,694 A | 1/2000 | Sullivan, III | 248/323 |
| D423,910 S | 5/2000 | Cyrell | D8/349 |
| 6,102,348 A | 8/2000 | O'Neill | 248/289.11 |
| 6,102,350 A | 8/2000 | Cyrell | 248/317 |
| 6,318,692 B1 * | 11/2001 | Cyrell | 248/316.1 |

OTHER PUBLICATIONS

Website Page, "Atlas Ceiling Mount", Lucasey, p. 1 of 1, http://www.lucasey.com/ceilingmounts/acm3045.html, Dec. 15, 1999.

Website Pages, "OmniMount Systems", pp. 1 and 2, http://www.omnimount.com/home.tpl?cart=3028091967173430, Dec. 15, 1999.

* cited by examiner

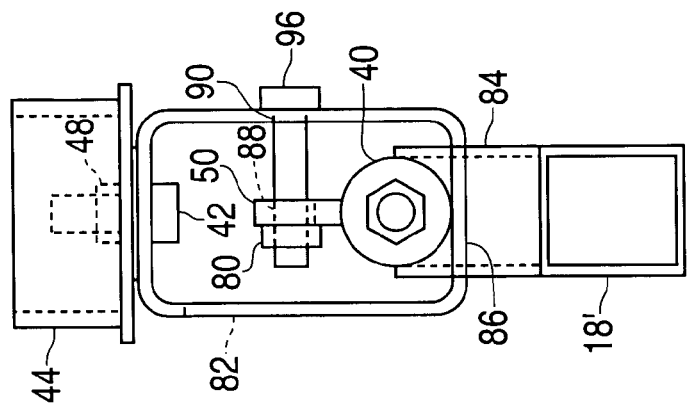
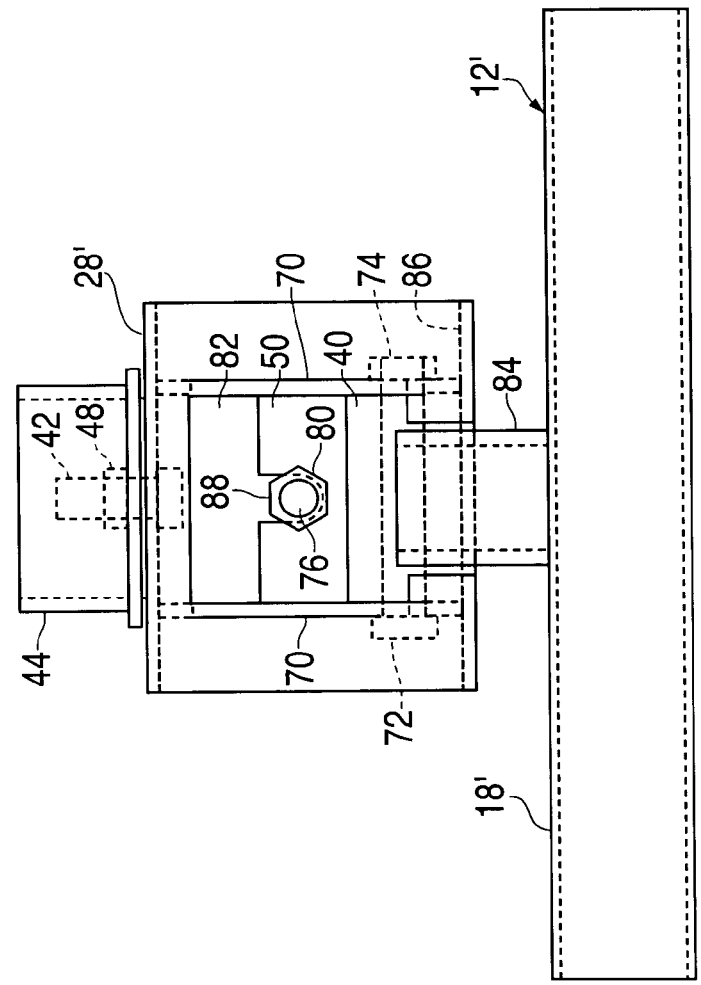

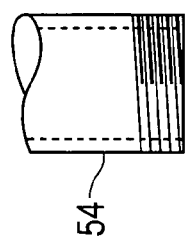
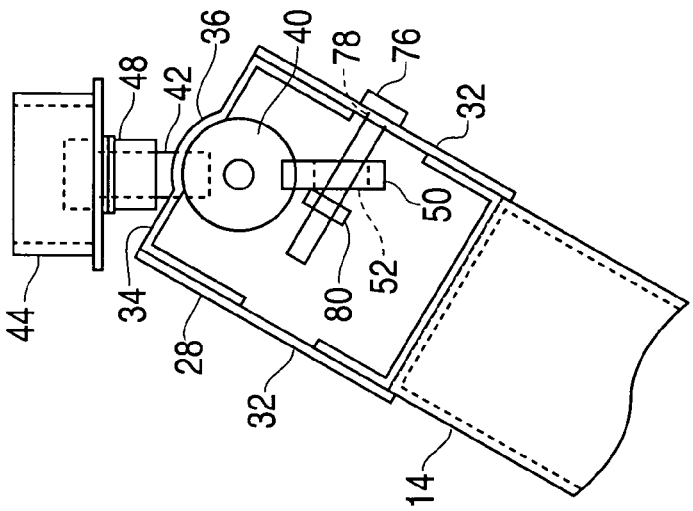
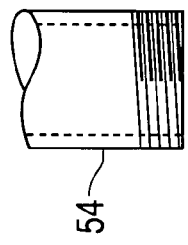
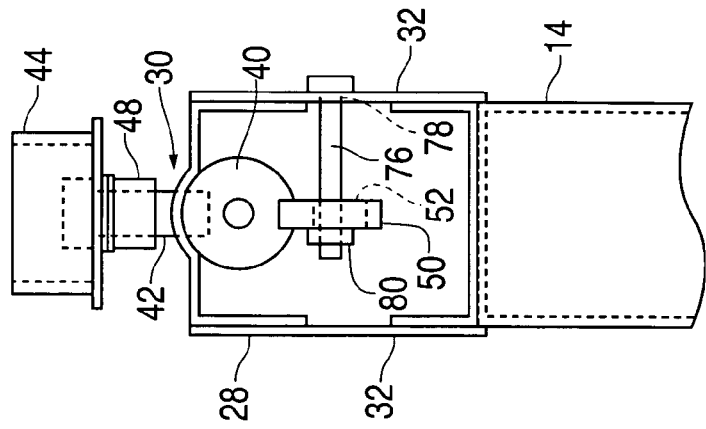

MOUNT FOR TV MONITOR

BACKGROUND OF THE INVENTION

1. Field of the Invention

This invention relates to a mount for a positionable object and has specific but not necessarily limited application to a ceiling or wall mount for a TV or a similar monitor.

2. Discussion of the Prior Art

Heretofore, wall and ceiling mounts such as those manufactured by Peerless Industries, Inc. and OmniMount Systems, Inc., while permitting the relatively heavy monitor to be adjusted around vertical as well as horizontal axes of limited rotation, nevertheless have been of rather difficult installation. Normally, at least two individuals are required to suspend the monitor in the mount. One individual is needed to support the mount while the second individual secures the suspended mount in position.

SUMMARY OF THE INVENTION

In this invention, the TV monitor is supported within a box-like frame with the top of the frame connected to a swivel part which is attached to either the ceiling or the wall. The monitor within its support frame is suspended from the swivel by a sliding lateral movement in which the ceiling or wall mounted part of the swivel enters a receptive slot at the top of the support frame. In this manner, only one individual is required to appropriately suspend the monitor with the mount.

Once suspended, an adjustment screw secured to the mount frame within a yoke attachment allows the frame and the supported monitor to be pivoted about a horizontal axis for adjustment of position. A safe limited range of movement of the frame and monitor about the horizontal pivot axis is provided by the yoke in conjunction with the adjustment screw.

It is an object of this invention to provide a mount for a TV monitor of economical construction and ease of operation.

Another object of this invention is to provide a mount which is for a monitor such as a television and which may be installed by one individual.

Still another object of this invention is to provide a monitor which is for a television or similar electronic apparatus and which may be mounted either to the ceiling or to the wall.

Other objects of this invention will become apparent upon a reading of the following description.

BRIEF DESCRIPTION OF THE DRAWINGS

FIG. 6 is a side view of another embodiment of the mount of this invention.

FIG. 7 is an end view of the mount shown in FIG. 6 but with the end plates removed.

FIG. 13 is an end view in fragmentary form of the swivel and tilt components of the embodiment of FIG. 1.

FIG. 14 is a fragmentary end view like FIG. 13 but showing the frame of the monitor in tilted position.

DESCRIPTION OF THE PREFERRED EMBODIMENTS

The preferred embodiments hereinafter illustrated and described are not intended to be exhaustive or to limit the invention to the precise forms disclosed. They are chosen and described in order to best explain the principles of the invention so to enable others skilled in the art to best utilize the invention.

Figure 1:
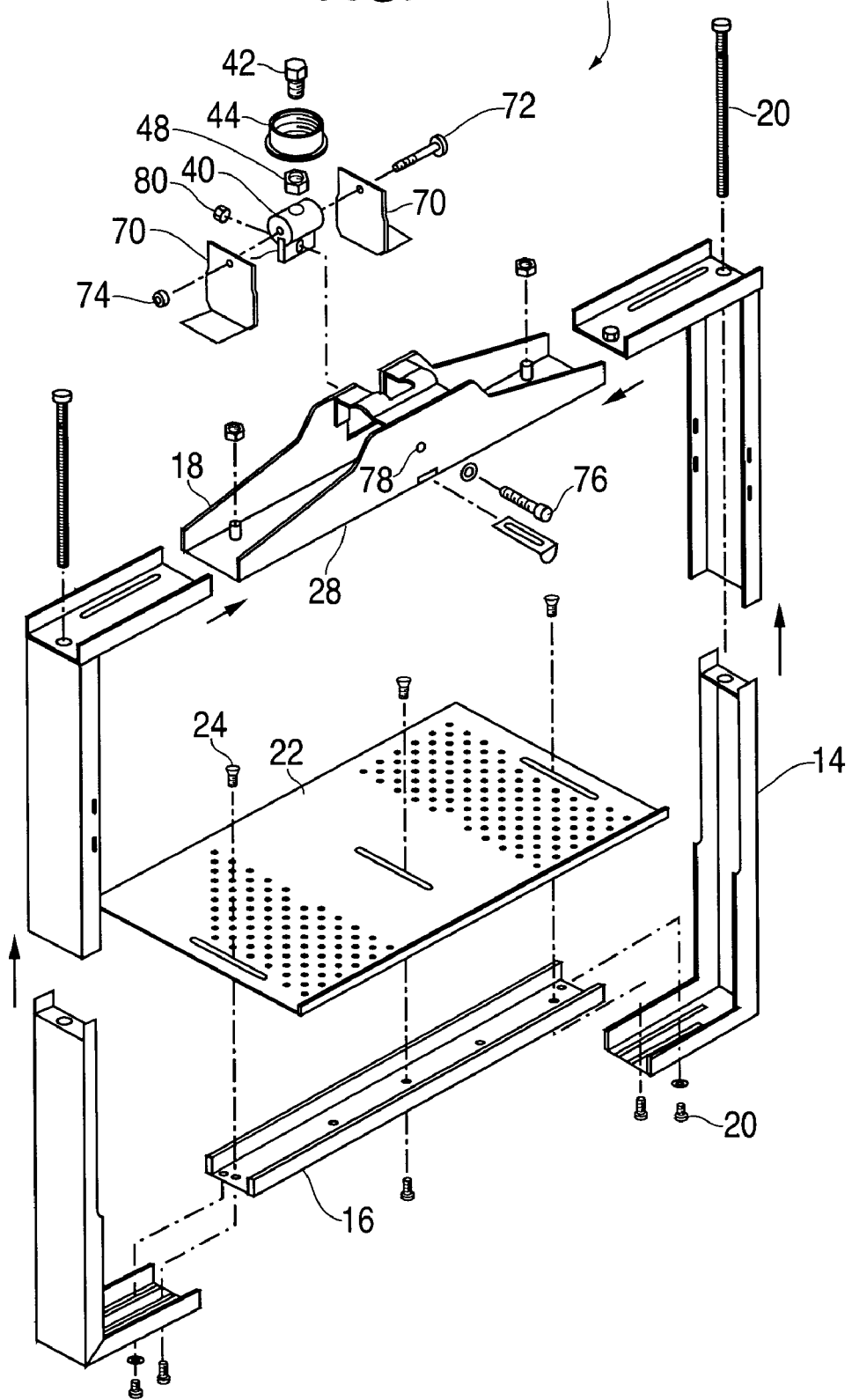
FIG. 1 is an exploded view of the mount of this invention showing the parts thereof with respect to one embodiment in separated form.
Figure 2:
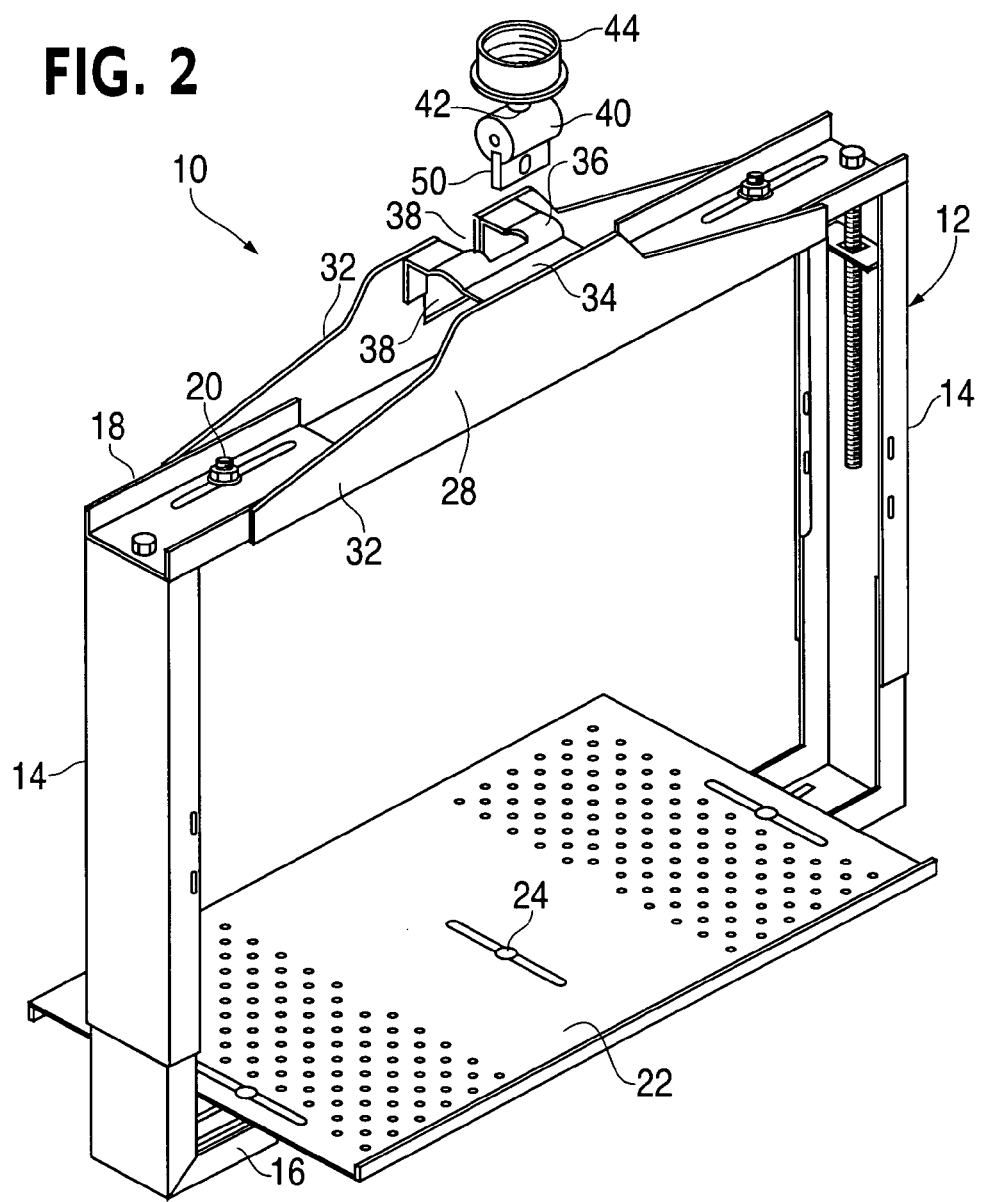
FIG. 2 is a view of the mount of FIG. 1 shown assembled but with swivel components separated.
Figure 3:
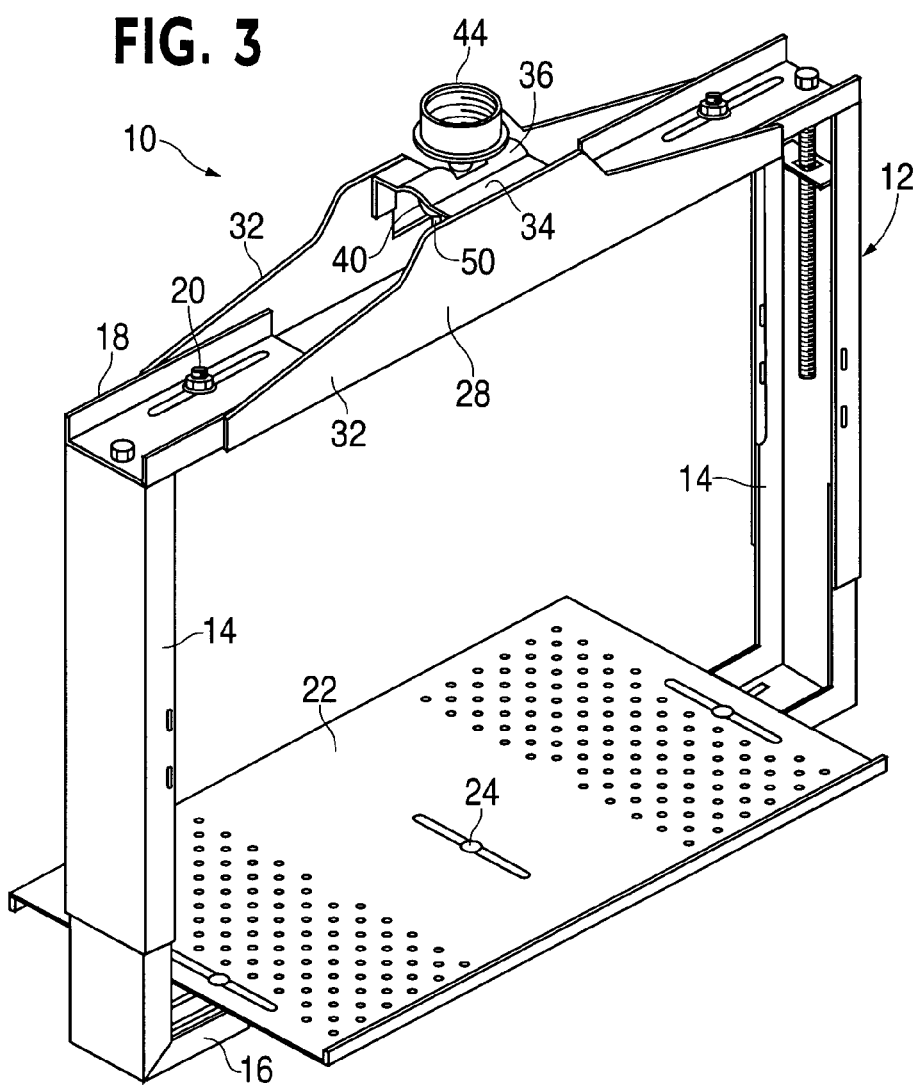
FIG. 3 is an assembled view of the mount of FIG. 1 showing the swivel components connected.
Figure 4:
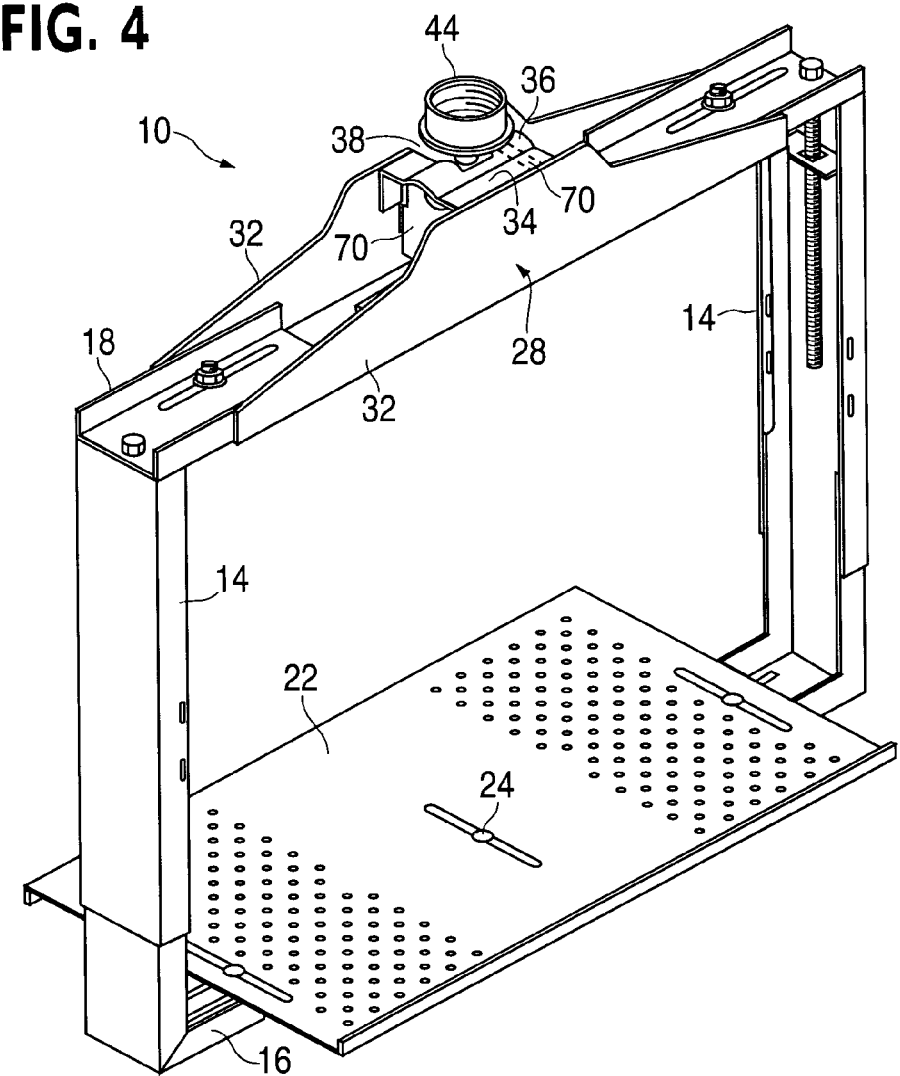
FIG. 4 is a perspective view of the mount of FIG. 1 showing the swivel components in secured form.
Figure 5:
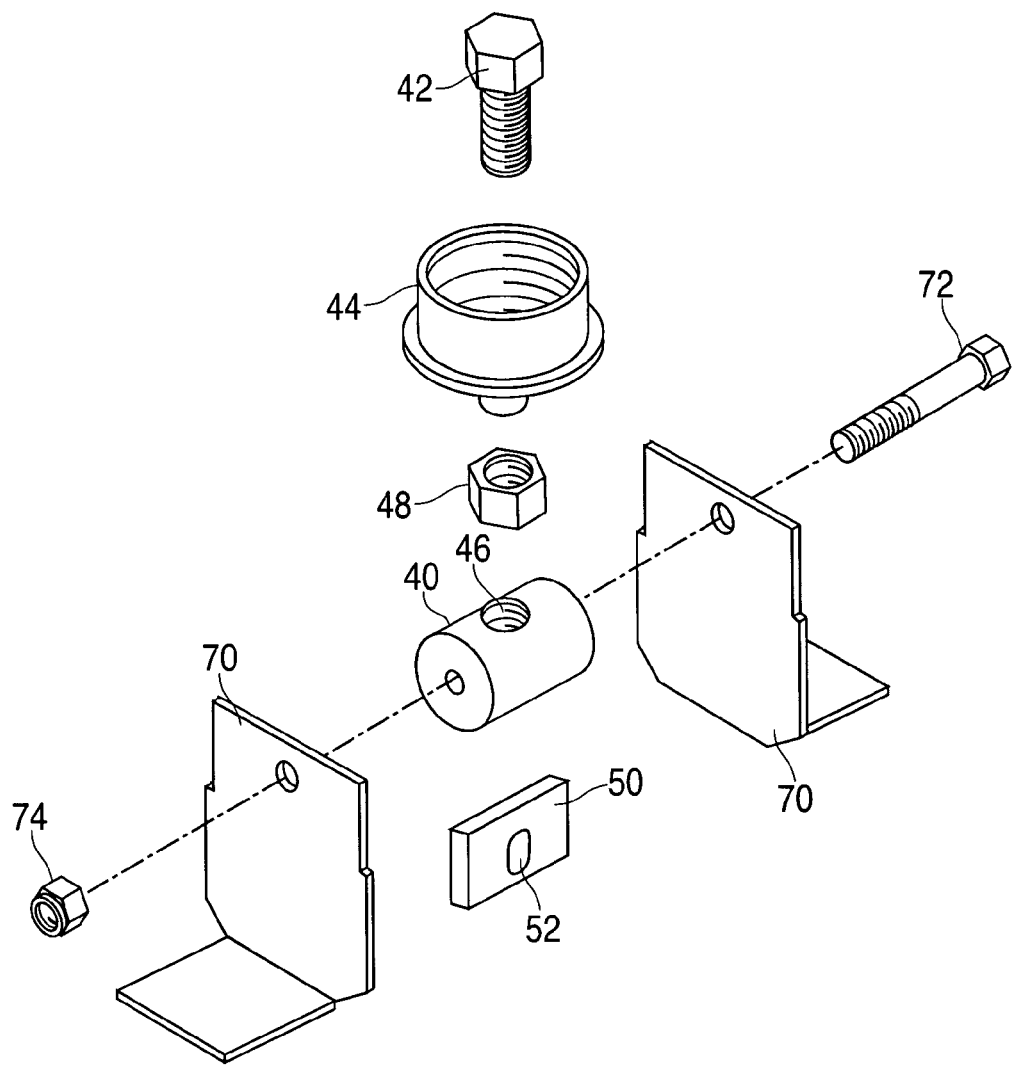
FIG. 5 is an exploded view showing components of the swivel in exploded form.
Figure 8:
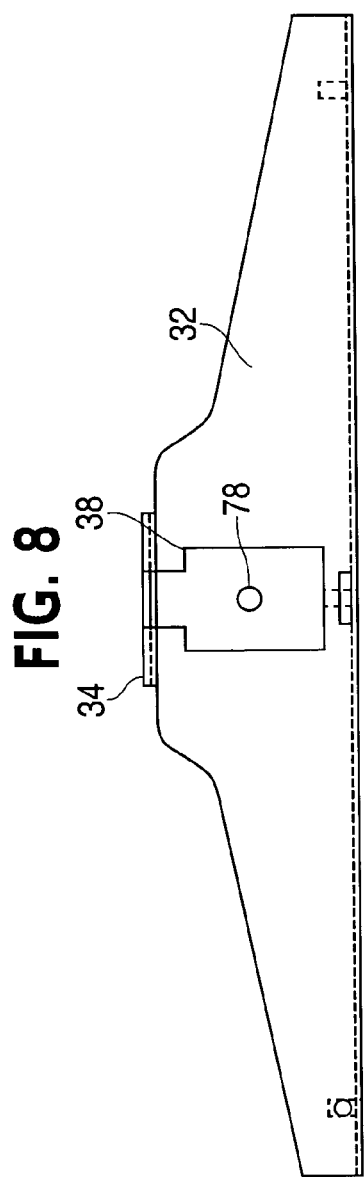
FIG. 8 is a side view of the catch part of the embodiment of FIG. 1.
Figure 9:
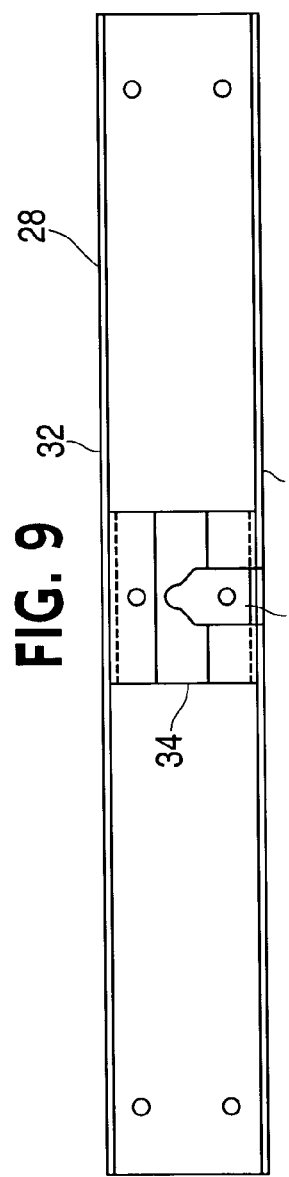
FIG. 9 is a top view of the catch part shown in FIG. 8.
Figure 10:
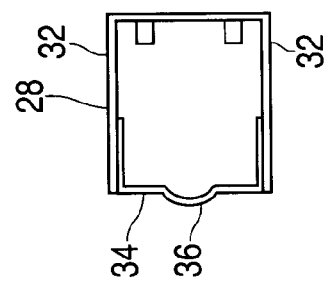
FIG. 10 is an end view of the catch part shown in FIG. 9.

Mount 10 of this invention is shown in assembled form in FIG. 4 and in an exploded disassembled form in FIG. 1. The mount includes a support frame 12 having sides 14, bottom 16, and top 18. Sides 14, bottom 16, and top 18 are joined by suitable fasteners such as screws 20 and 20' with a mounting plate 22 being connected to bottom 16 by fasteners 24. A TV monitor 26 or a similar device is attached to mounting plate 22. A particular component regarding frame 12 is catch part 28 which forms a part of the swivel 30 connecting frame 12 to the appropriate wall or ceiling attachment which will be later described. Catch part 28 forms a component of top 18 of the frame and includes upturned side walls 32 which parallel one another in a spaced-apart relationship. Extending between side walls 32 and forming a component of the catch part is retainer 34. Retainer 34 includes an arcuate portion 36 which parallels the general transverse orientation of the frame. A slot 38 is formed in one of the catch part side walls 32 and extends into arcuate portion 36 of the retainer.

Swivel 30 includes in addition to catch part 28, a barrel 40 suspended from a bolt or rotation member 42 retained within a cup part 44. Bolt 42 extends through cup part 44 and is turned into a threaded bore 46 in barrel 40 and thereafter welded or otherwise fixedly secured to the barrel so that there is no rotative movement between the barrel and bolt 42. A nut 48 previously turned upon bolt 42 is positioned between cup part 44 and barrel 40. Nut 48 is tightened against the underside of cup part 44 once the frame and monitor is suitably oriented so as to secure the monitor and frame against pivotal movement about the vertical axis when in use. A key 50 is fixedly attached such as by welding to barrel 40, extending the longitudinal length of the barrel. Key 50 includes an oval opening 52.

Figure 15:
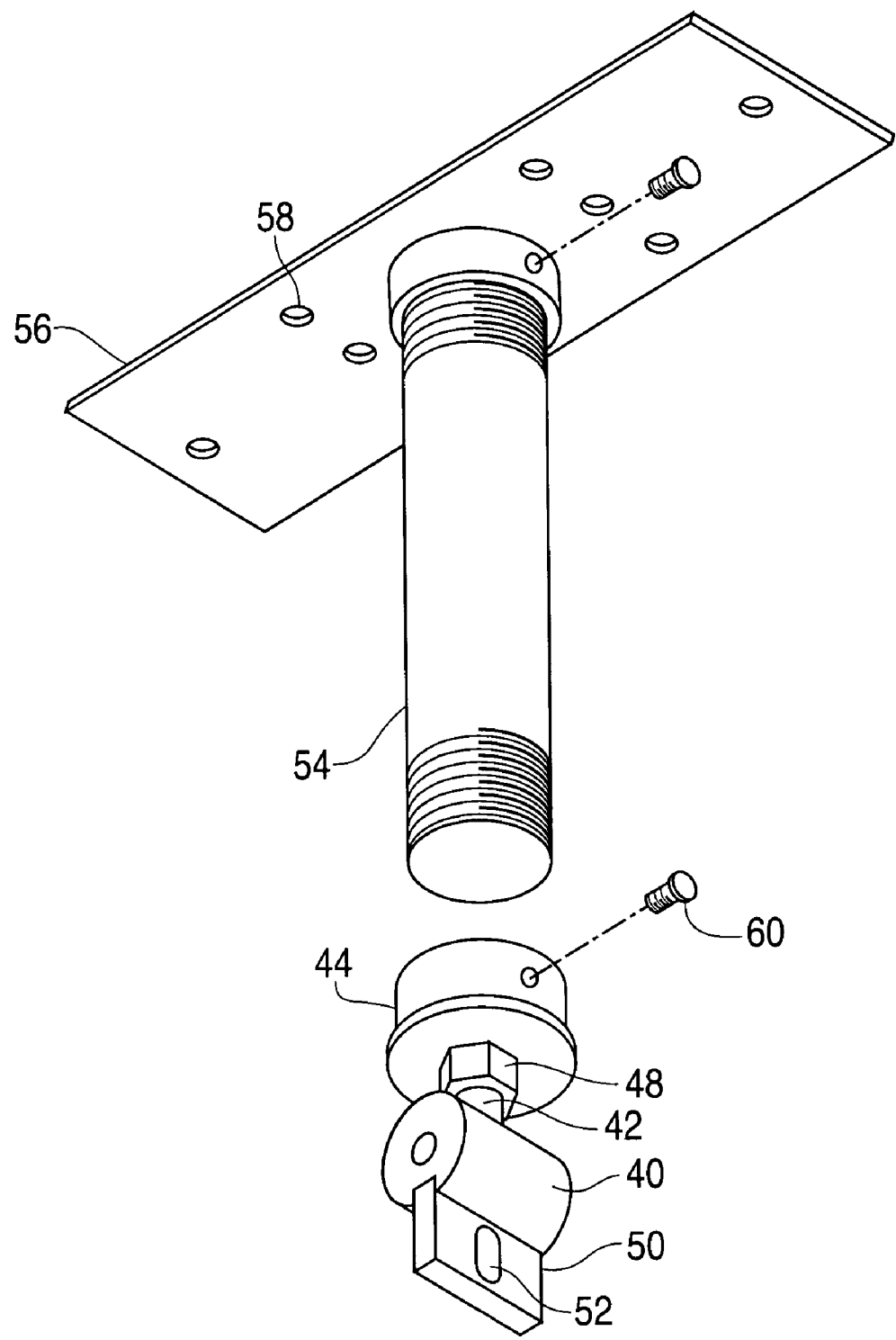
FIG. 15 is a perspective view of a ceiling support for the mount.

Barrel 40 of swivel 30 may be suspended from a vertical stanchion 54 (see FIG. 15) carried by a mounting plate 56 which is adapted to be secured to a ceiling through suitable fasteners turned into the ceiling through openings 58 in the mounting plate. The lower end of stanchion 54 is threaded which permits the internally threaded cup part 44 to be turned and threaded on to the stanchion and there held in place against a rotative movement by a set screw 60.

Figure 16:
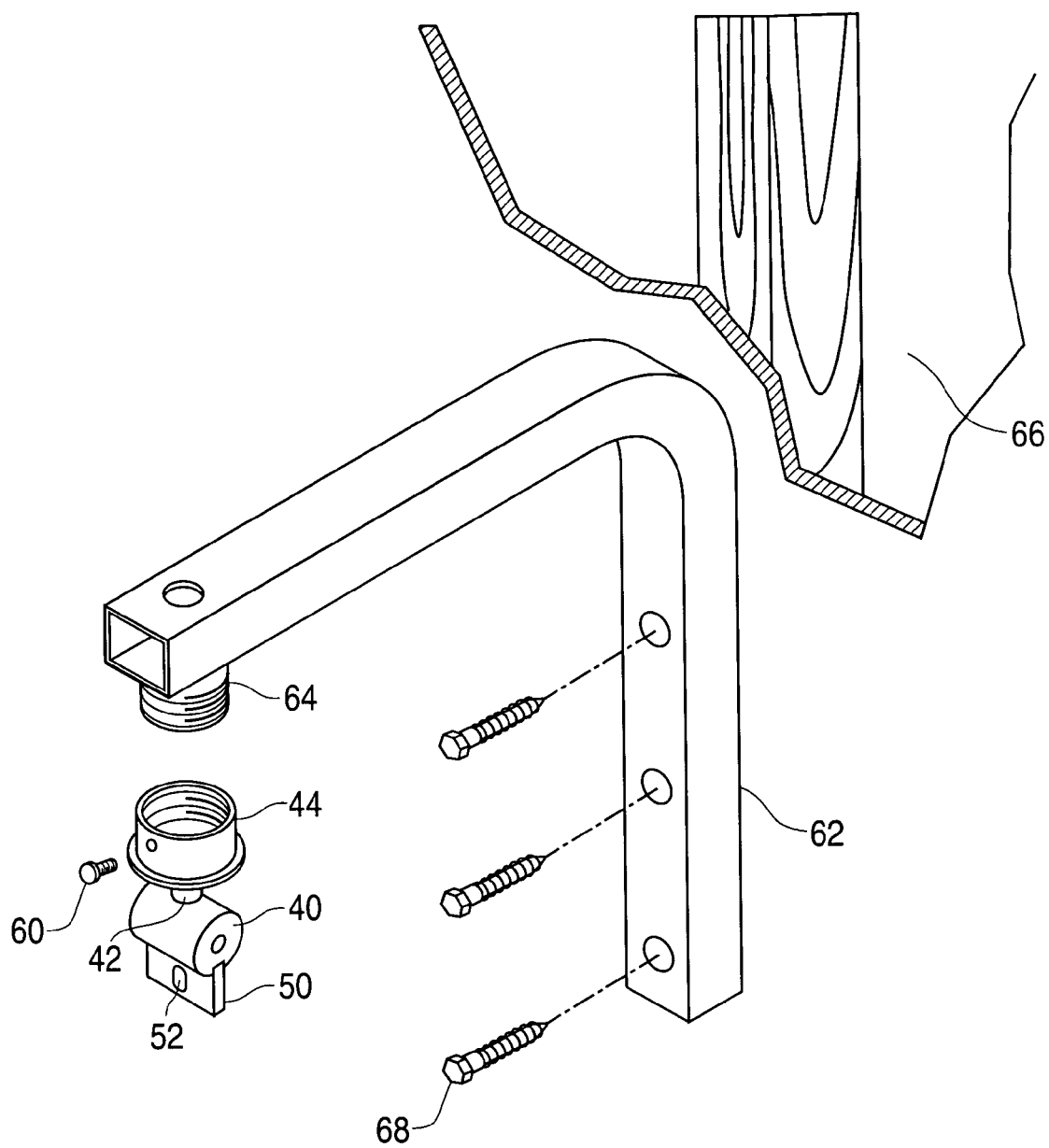
FIG. 16 is a perspective view of a wall support for the mount.

Alternatively, a right angle bracket 62 (see FIG. 16) carrying a threaded stub 64 can be secured to a side wall 66 through lag bolts 68 or similar fasteners. Stub 64 is threaded in a fashion similar to stanchion 54 so as to allow cup part 44 to be turned upon the stub and secured in place by set screw 60.

First, barrel 40 of swivel 30 is appropriately located and suspended through either stanchion 54 or bracket 62 depending upon the desired orientation and space availability of the room. With barrel 40 suspended and secured to either the ceiling or side wall mount, frame 12 and attached monitor can be picked up by one individual and moved over barrel 40 by having the barrel 40 fitted through slot 38 in catch part side wall 32 and retainer 34 with the barrel seating upwardly into the arcuate portion 36 of the retainer where it is nested. In this manner, a single individual can mount and support the frame with its monitor. A pair of end plates 70 are then inserted between the side walls 32 of catch part 28 and attached by a bolt 72 and nut 74 at each end of the barrel to anchor the barrel within catch part 28. Nut 74 is preferably not tightened yet.

Figure 11:
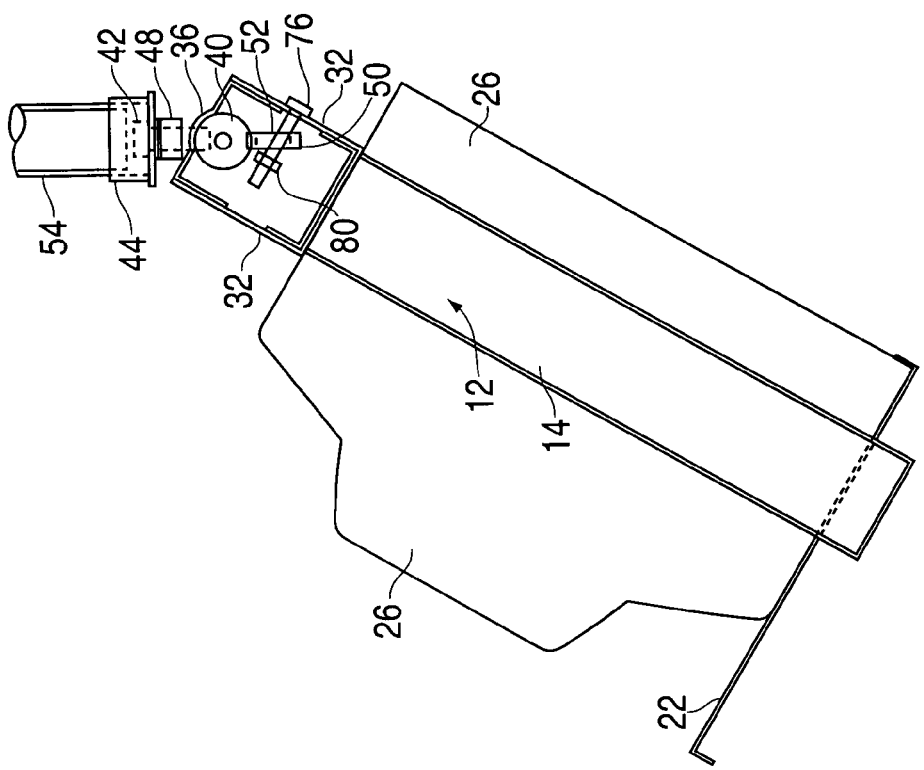
FIG. 11 is a side view of the mount of FIG. 1 shown supporting a monitor.
Figure 12:
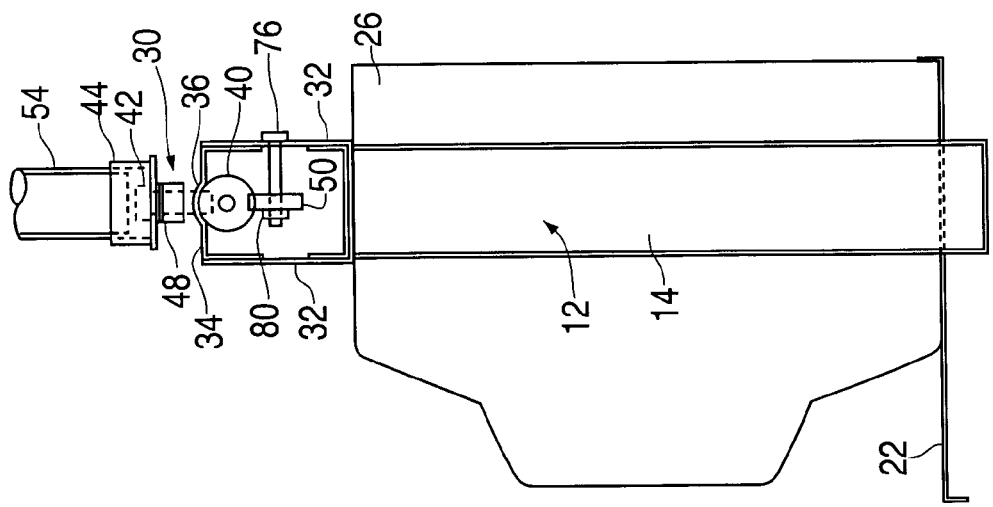
FIG. 12 is a side view of the monitor shown in FIG. 11 but with the frame thereof tilted.

A bolt 76 is now fitted through an opening 78 in the forward positioned side wall 32 of catch part 28. The bolt extends freely through opening 52 in key 50 secured to barrel 40. A nut 80 is turned upon the extending end of bolt 76 and tightened against key 50, as shown in FIG. 11. Insertion of bolt 76 and the application of nut 80 is accomplished by the installer once the frame and monitor have been suspended from barrel 40 and are freely hanging in a vertical orientation such as shown in FIG. 11 and FIG. 13. The installer then turns bolt 76 while holding nut 80, both being accessible from either end of catch part 28, causing the frame and its supported monitor to be drawn into a tilted position such as illustrated in FIG. 12. In this manner, the angular position of frame 12 and the monitor can be set by the installer to accommodate the needs of the user of the monitor. The enlarged oval opening 52 in key 50 acts as a yoke and allows for a range of tilt of the frame while restricting the range within the confines of the area of opening 52. In this manner, the frame with its limited range of tilt may be safely adjusted. At this time, nut 74 can be tightened upon bolt 72 to secure the end plates 70 in position within catch part 28. The angular orientation of the frame, that is its position right or left relative to a vertical axis, is accommodated by the rotation of bolt 42 within cup part 44. Once the frame and its monitor has been placed in its desired angular orientation, nut 48 is tightened against the bottom surface or base of cup part 44, thus locking the frame and monitor against such a rotational movement relative to its attachment to the ceiling or wall.

FIGS. 6 and 7 depict a modified embodiment of the swivel connection. In this embodiment, cup part 44 is attached by bolt 42 and nut 48 to the catch part 28'. Catch part 28' is a separate component and is in tubular form having a slotted opening 82 formed in one of its side walls. The frame 12' (shown only partially for illustrative purposes) which supports the monitor includes a top 18' having an upwardly extending stanchion 84. Attached to the top of stanchion 84 is barrel 40 having its key 50 projecting upwardly. To hang or support frame 12', the user lifts the frame carrying barrel 40 and the monitor with barrel 40 being inserted through slot 82 in catch part 28' and lowered so that the barrel is seated upon the bottom wall 86 of catch part 28'. Slot 82 extends not only along the side wall of catch part 28, but also in a narrow or restricted form along bottom wall 86. This allows frame 12' and barrel 40 to be seated within catch part 28' and supported by having the opposite end portions of barrel 40 resting upon the unslotted portion of bottom wall 86 of the catch part.

Key 50 attached to barrel 40 in this embodiment has a slotted opening 88. A side opening 90 is provided in catch part 28' in the side wall opposite slot 82. Bolt 76 is inserted through side opening 90 and opening 88 in the key with nut 80 being turned upon the bolt such as illustrated in FIG. 12. Again, this is accomplished preferably after the frame and monitor has been suspended in catch part 28' with the length of the catch part being such that easy access to the interior of the catch part is provided for the installer to insert bolt 76 and to apply nut 80 upon the bolt. While holding nut 80, bolt 76 can be turned by the installer causing the frame 12' to be tilted relative to catch part 28'. Also, the angular orientation of frame 12' relative to cup 44 can be adjusted by movement of catch part 28' and suspended frame 12' about bolt 42. Bolt 42 can be tightened to draw catch part 28' against the base of cup part 44 with nut 48 being welded or otherwise secured against rotation within the interior of the cup part. End plates 70 can now be placed at the ends of barrel 40 and secured by bolt 72 and nut 74.

The invention is not to be limited to the details above given but may be modified in the framework of the following appended claims. For example, in the embodiments shown in FIGS. 1–5 and 8–16, the barrel may be attached to support frame 12 and catch part 28 attached to the vertical stanchion 54. Analogous shapes may also be substituted to perform the intended function such as a ball may be substituted for barrel member 54. Also, the shape of the key and slot could be varied to any configuration that will draw the frame when the bolt is turned. Furthermore, numerous frame shapes may be substituted for support frame 12 in lieu of the sliding channel members disclosed.

What is claimed is:

1. A mount for an appliance comprising: a frame for supporting said appliance, said frame including an upper catch part, said catch part having a slot therein; and a swivel part suspended from a support adapted to be mounted to a wall or ceiling, said swivel part fitted into said slot and engaging the catch part to support said frame, the slot having a nonuniform width with a first portion of the slot being wider than a second portion of the slot, the first portion of the slot being wide enough so that the swivel part is insertable therethrough, and the second portion of the slot being narrower than the swivel part so that the swivel part does not fit through the second portion and engages the catch part adjacent the sides of the second portion.

2. A mount for an appliance comprising: a frame for supporting said appliance, said frame including an upper catch part, said catch part having a slot therein; and a swivel part suspended from a support adapted to be mounted to a wall or ceiling, said swivel part fitted into said slot and engaging the catch part to support said frame, said swivel part including a barrel-shaped member, said catch part including a retainer intersected by said slot and said retainer including an arcuate portion, said barrel-shaped member located under said arcuate portion to allow pivotal movement of said arcuate portion about said barrel-shaped member.

3. The mount of claim 2, wherein said barrel-shaped member carries a key part extending into said catch part, said key part having an opening, said catch part having a side wall, a bolt extending through a side wall in said catch part and key part opening, a nut turned upon said bolt and against said key part, said bolt and said nut drawing said frame toward said key part when said nut is turned upon said bolt against the key part to tilt said frame relative to said swivel part.

4. The mount of claim 2, wherein said swivel part includes a rotation member allowing said frame to be rotated about a vertical axis.

5. The mount of claim 4, further comprising a cup part, and a nut and wherein said rotation member is a bolt, said bolt extending through said cup part and threadingly engaged with said nut and threads located in a bore in said barrel-shaped member.

6. The mount of claim 5, wherein the rotational orientation may be fixed by tightening said nut against said cup part.

7. The mount of claim 2, further comprising a pair of end plates mounted on opposite sides of said barrel-shaped member to retain said barrel-shaped member within said catch part.

8. The mount of claim 7, wherein the end plates are mounted to said barrel-shaped member with a retaining bolt which extends through apertures in the end plates and a longitudinal opening in said barrel, said retaining bolt being retained with a nut.

9. A mount for an appliance comprising: a frame for supporting said appliance; an upper catch part having a retainer portion with a seating surface, said catch part having a singular slot therein that is located centrally relative to side portions of said frame and extends into the seating surface; and a swivel part including a barrel-shaped member fitted into said slot and seated against the seating surface of the retainer portion on the catch part to support said frame from a wall or ceiling.

10. The mount of claim 9, wherein said catch part includes a retainer intersected by said slot, said retainer having an arcuate portion located adjacent said barrel-shaped member, said arcuate portion pivoting relative thereto.

11. The mount of claim 9, further comprising a key part attached to said barrel-shaped member and extending into said catch part, said key part having an opening, said catch part having a side wall, a bolt extending through a side wall in said catch part and key part opening, and a nut turned upon said bolt and against said key part, said bolt and said nut partially defining a tilting mechanism by which said frame is drawn toward said key part when said nut is turned upon said bolt against the key part to tilt said frame relative to said swivel part.

12. A mount for an appliance comprising: a frame for supporting said appliance; an upper catch part, said catch part having a singular slot therein that is located centrally relative to side portions of said frame; and a swivel part fitted into said slot and engaging the catch part to support said frame from a wall or ceiling, said swivel part including a rotation member to allow rotation of the frame about a vertical axis.

13. The mount of claim 12, wherein the rotation member is a bolt, said bolt extending through a cup part and a nut and into a threaded bore of said barrel-shaped member.

14. The mount of claim 13, wherein rotation about the vertical axis may be fixed by tightening said bolt against said cup part.

15. A mount for an appliance including:
a support for supporting the appliance from a ceiling or a wall;
a barrel-shaped swivel part; and
a catch part having a retainer portion with a seating surface and a slot extending into the seating surface, the barrel-shaped swivel part seated against the seating surface of the retainer portion on the catch part, one of either the barrel-shaped swivel part or catch being connected to the support and the other connected to the appliance, and the barrel-shaped swivel part being moveable relative to the catch part to tilt and secure the appliance in a position relative to a vertical plane.

16. The mount of claim 15 wherein the catch part has a slot and the swivel part is at least partial located through the slot.

17. The mount of claim 16 wherein the barrel-shaped swivel part is restrained from horizontal movement relative to the catch part.

18. The mount of claim 15, further including a rotation member for allowing rotation of the appliance about a vertical axis.

19. The mount of claim 15 wherein the barrel-shaped swivel part has a key part, the key part having an opening for receiving a bolt, the bolt extending through a side wall of the catch part and the key part opening, a nut threaded upon the bolt and against the key part, the bolt and the nut tilting the appliance from vertical when the bolt is turned relative to the nut.

20. The mount of claim 15 wherein the swivel part is attached to the support and the catch part is attached to a frame holding the appliance.

21. A mount for an appliance including:
a frame for holding the appliance;
a support assembly for supporting the frame from a wall or ceiling, the frame including a catch part rotationally fixed relative to the frame the catch part having a slot therein;
a tilting mechanism including a threaded member interconnecting the frame and the support assembly and turning the threaded member in one direction both tilts and holds the appliance relative to a vertical plane, the tilting mechanism being at least partially located in the catch part and engaged therewith to tilt and hold the appliance into the tilted position, and the tilting mechanism including a barrel-shaped member bearing against an arcuate portion of the catch part.

22. The mount of claim 21 further including a key part attached to the barrel-shaped member, the key part having an opening; and a bolt extending through a side wall in the catch part and the key part opening.

* * * * *